Jan. 20, 1959 G. L. BARD 2,869,877
PLAY-BACK SOUND REPRODUCER
Filed April 6, 1956 5 Sheets-Sheet 1

INVENTOR.
GEORGE L. BARD.
BY
Percy Freeman
ATTORNEY.

Jan. 20, 1959  G. L. BARD  2,869,877
PLAY-BACK SOUND REPRODUCER
Filed April 6, 1956  5 Sheets-Sheet 2
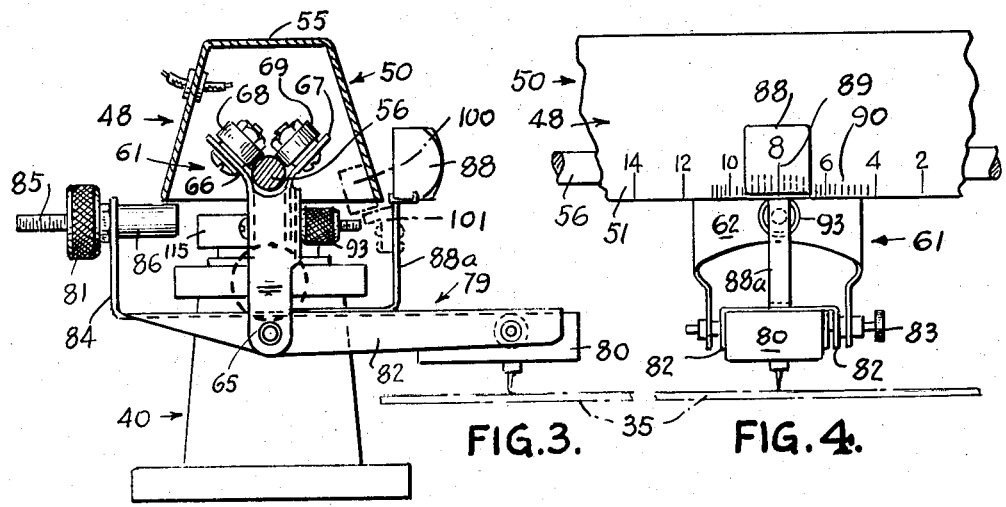
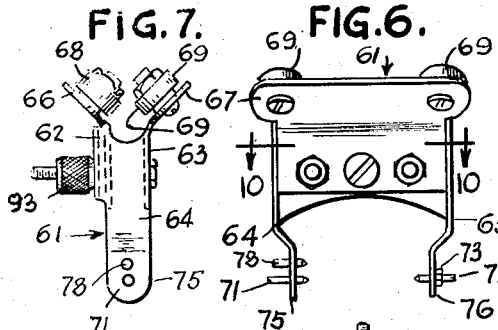
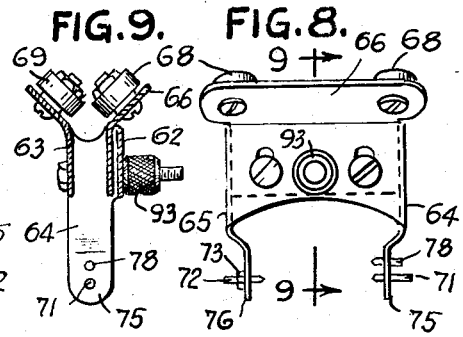
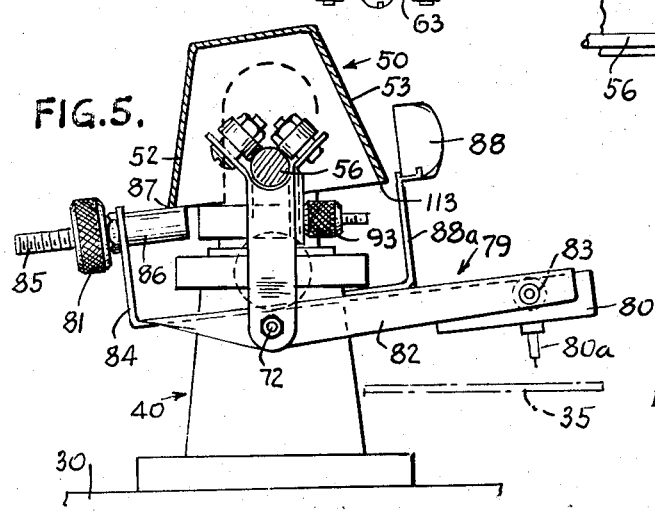
INVENTOR.
GEORGE L. BARD.
BY
*Percy Freeman*
ATTORNEY.

Jan. 20, 1959 G. L. BARD 2,869,877
PLAY-BACK SOUND REPRODUCER
Filed April 6, 1956 5 Sheets-Sheet 3
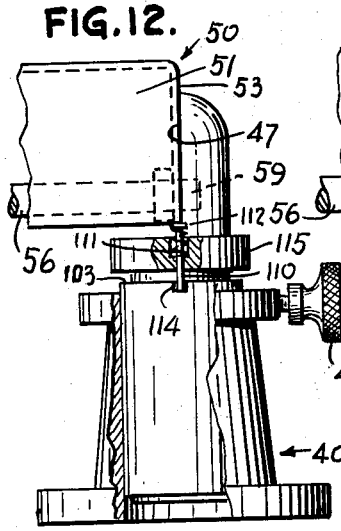
FIG.12.
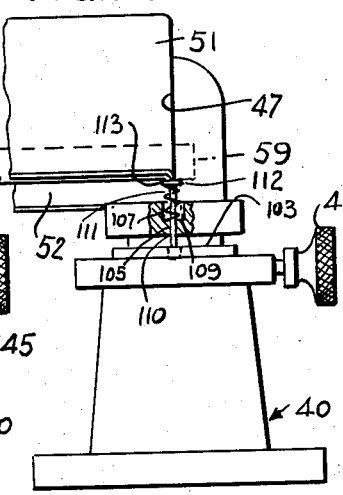
FIG.13.
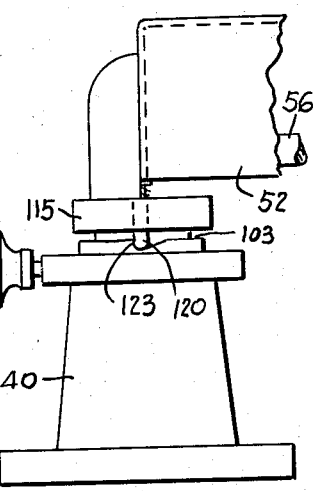
FIG.14.
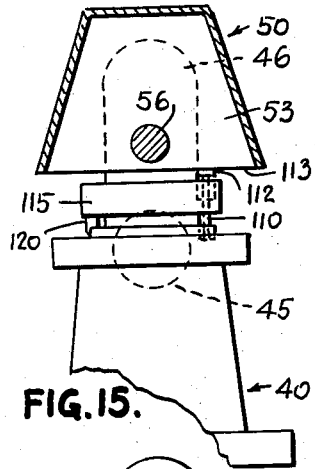
FIG.15.
FIG.16.
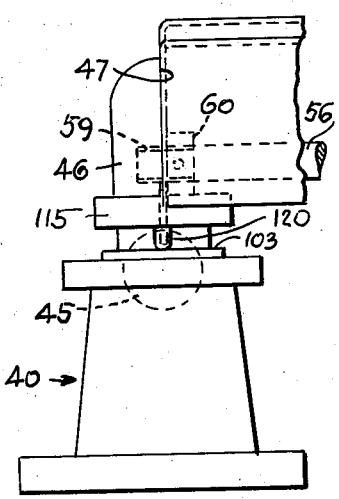
FIG.17.
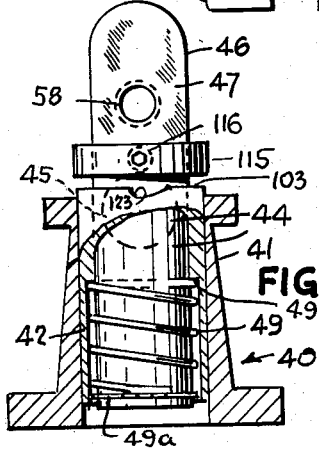
FIG.18.
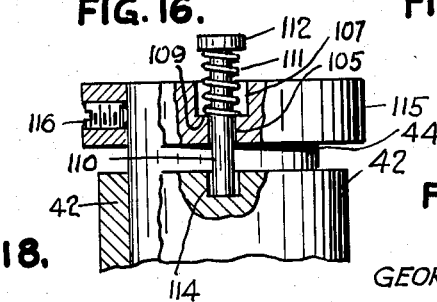
FIG.12a.
INVENTOR.
GEORGE L. BARD.
BY
Percy Freeman
ATTORNEY.

INVENTOR.
GEORGE L. BARD.
BY
Percy Freeman
ATTORNEY

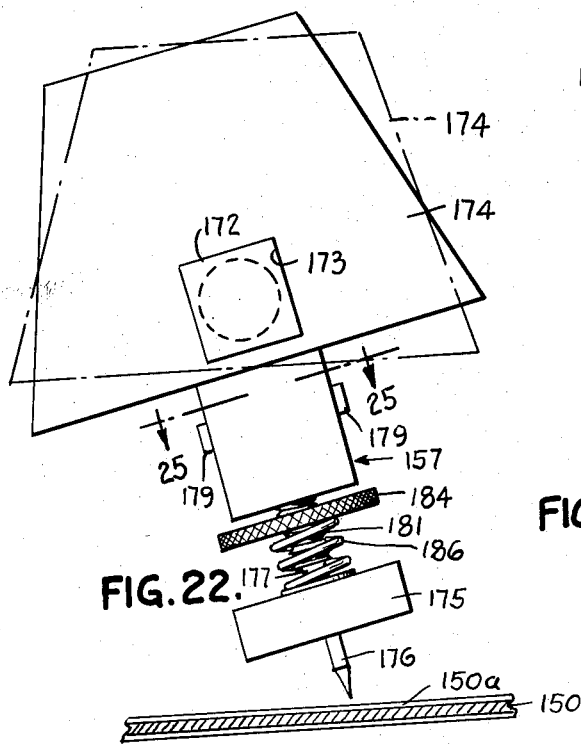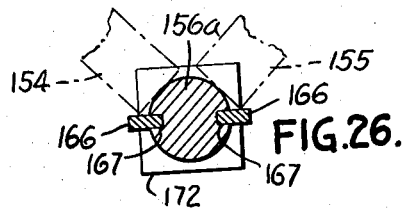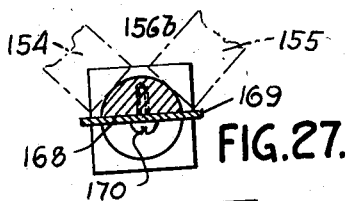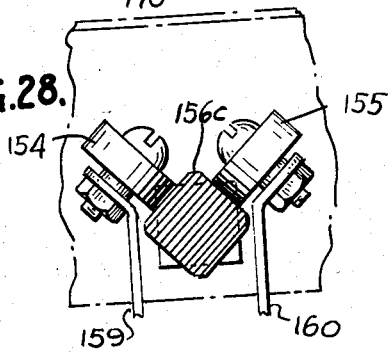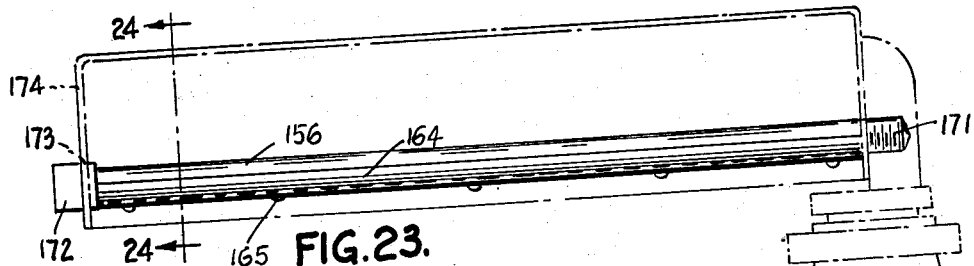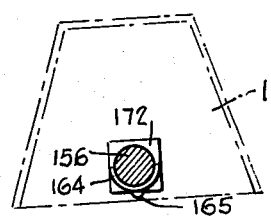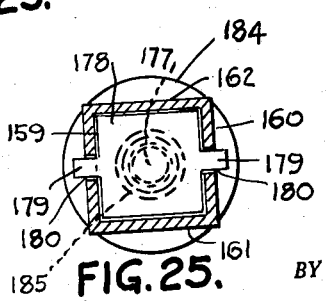

United States Patent Office 2,869,877
Patented Jan. 20, 1959

2,869,877

PLAY-BACK SOUND REPRODUCER

George L. Bard, Bronxville, N. Y., assignor to Ortho-Sonic Instruments, Inc., New Rochelle, N. Y., a corporation of New York Application April 6, 1956, Serial No. 576,733

4 Claims. (Cl. 274—23)

This invention relates to improvements in tone arms of sound reproducing equipment and, more particularly, to tone arms used for play-back apparatus.

While master records are cut radially by having the cutting stylus move in a straight line from the edge of the record toward its center, conventional pick-up arms guide the play-back stylus along an arc of a circle. Ordinarily the pick-up stylus is fixed at one end of the tone arm which is pivotally mounted at its other end on the base of the turntable mechanism and, being pivoted from a fixed point in that way, cannot follow the original cutting stylus movement, thereby creating what is known as "tracking error." Tracking error is the angle of stylus vibration with a tangent to the groove at the point of contact. The friction created by the pressure of the stylus against the groove wall as it guides the stylus in its horizontal arcuate movement, causes substantial wear on the grooves of the record, thereby reducing the useful life of the record. The tracking error, of course, reduces the quality of reproduction and the wear on the record grooves reduces the usefulness of the record. An object of this invention, therefore, is to provide a tone arm for a pick-up stylus that is simple in construction, of high sensitivity, and efficient in operation that will effectively overcome the aforementioned difficulties.

Another object of this invention is to provide a tone arm for supporting a pick-up stylus in which the stylus is adapted to move radially from the edge of the record to the center thereof.

Another object of this invention is to provide a tone arm for supporting a stylus in such a way that the stylus is vertically placed into and removed from engagement with the grooves of the record by a slight tilt of the arm so that the record cannot be scratched.

A still further object of this invention is to provide a tone arm for supporting a pick-up stylus in which the weight, balance, and pressure of the stylus on the record may be simply adjusted.

Still another object of this invention is to provide a tone arm for supporting a pick-up stylus in which the playing of the record may be interrupted and resumed without skipping part of the record, and wherein index means are provided to enable the playing of any predetermined portion of the record that may be identified by such indexing.

Still another object of this invention is to provide a tone arm for play-back recording equipment that is simple to install, attractive in appearance, and efficient for producing sound of high quality at a minimum rate of wear on the records used.

All of the foregoing and still further objects and advantages of the invention will become apparent from a study of the following specification, taken in connection with the accompanying drawings, wherein:

Fig. 3 is an enlarged sectional view taken along line 3—3 of Fig. 1.

Fig. 4 is a partial side view of Fig. 3.

Fig. 5 is a view similar to Fig. 3, but showing the stylus in record disengaged position.

Fig. 6 is an enlarged view of the stylus supporting carriage.

Fig. 7 is a side view of the carriage shown in Fig. 6.

Fig. 8 is a view similar to Fig. 6, showing the other side thereof.

Fig. 9 is a sectional view taken along the line 9—9 of Fig. 8.

Fig. 10 is a sectional view taken along line 10—10 of Fig. 6.

Fig. 11 is a fragmentary view, partly in section, showing the arrangement of the tone arm and support therefor.

Fig. 12 is a fragmentary view, partly in section, of the tone arm and associated support posts.

Fig. 12a is an enlarged view with parts broken away of certain of the elements shown in Fig. 12.

Fig. 13 is a view similar to Fig. 12 showing the tone arm in tilted or stylus-disengaged position.

Fig. 14 is a view similar to Fig. 13, showing the reverse side thereof.

Fig. 15 is an end view, in section, showing the tone arm and support post in stylus-engaged position.

Fig. 16 is a view similar to Fig. 15 with the tone arm in tilted or stylus-disengaged position.

Fig. 17 is a view similar to Fig. 14, with the tone arm rotated 90 degrees relative to the base.

Fig. 18 is a detail view, partly in section, of the tone arm support post.

Fig. 22 is an end view showing the stylus in disengaged position.

Fig. 23 is a front elevational view of the tone arm shown in Fig. 19 with the housing broken away to show the construction of the cartridge carrier rod.

Fig. 24 is a sectional view taken along line 24—24 of Fig. 23.

Fig. 25 is a sectional view taken along line 25—25 of Fig. 22.

Figures 20, 21:
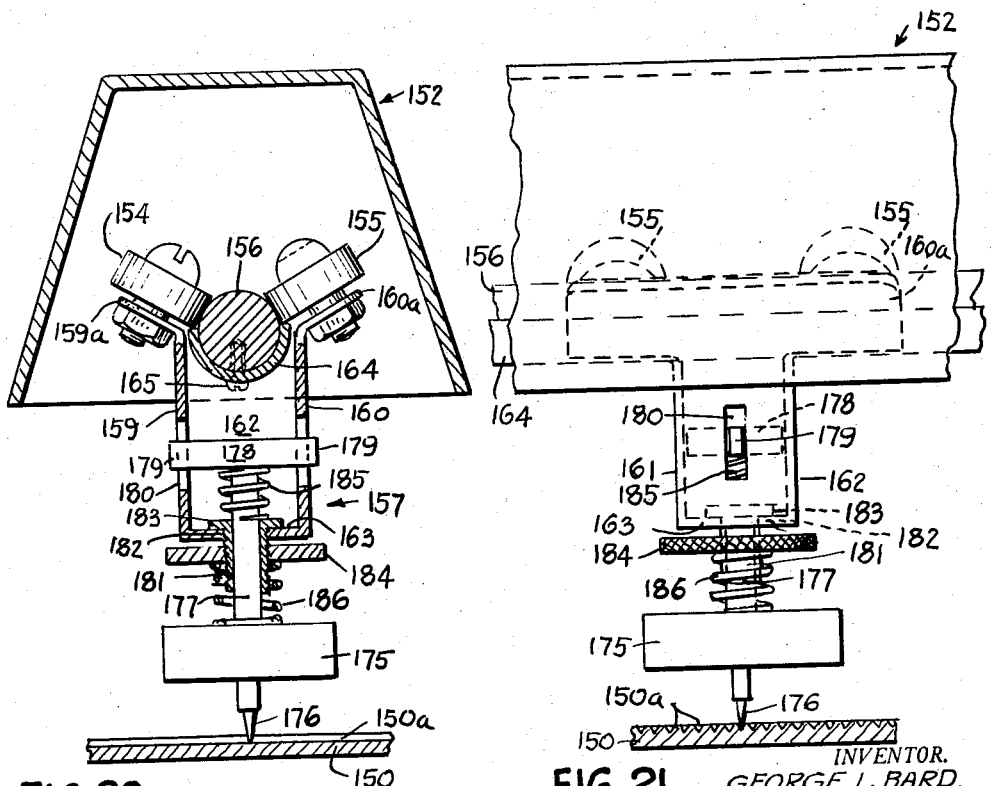
Fig. 20 is a transverse sectional view of the tone arm shown in Fig. 19.
Fig. 21 is a side view of Fig. 20.

Figs. 26, 27, and 28 are detail views of modified forms of the carrier rod shown in Figs. 20 and 23.

Referring now to Figs. 1 to 18, inclusive, which disclose a preferred form of this invention, a table 30 is shown having an electric motor 31 disposed therebeneath with a spindle 32 extending upwardly through the table in supporting engagement with a turn-table 33. A tone arm lifting device is also shown beneath the table 30, but does not form any part of this invention. The turntable is provided with a felt or otherwise padded surface 36 for supporting a conventional record 35 thereon.

Referring now to Fig. 18 of the drawing, a tone arm support 40 is shown to comprise a base 41 that is adapted to be secured to the floor 30 and which slidably and rotatably supports a circular sleeve 42 therein. The hollow sleeve 42 slidably and rotatably supports a pivot post 44 therein and is urged into mating engagement therewith by means of a compression spring 49 that is disposed between a washer 49a secured to the bottom of the post 44 and the shoulder 49b provided between the upper and lower interior surfaces of the sleeve 42. A securing means such as a set screw 45 is threaded through the base 41 into engagement with the sleeve 42 so that the latter may be selectively positioned within the base at any desired height. The pivot post 44 is provided with a semi-circular head 46 which presents a flat, vertical surface that is adapted to engage and support the tone arm housing 50. Referring to Figs. 1 to 5, the housing 50 is shown to have a front wall 51, a rear wall 52, an inside end wall 53 disposed adjacent to the supporting post, and an outside end wall 54 spaced from the supporting post, all of which is enclosed at the top by a top wall 55. A guide or carriage support rod 56 extends through the outside end wall 54 and inside end wall 53, respectively, into threaded engagement with an opening 58 disposed in the flat side 47 of the pivot post, and is secured thereto by the threaded end 59 of the rod. A collar 60 secured to the support rod 56 provides a rigid and stable connection for the housing on the post in association with the threaded end of the rod.

An inverted T-shaped carriage 61 is supported from the rod 56 for longitudinal movement thereon. As more clearly shown in Figs. 6 to 9, the carriage includes a leg portion having a front vertical flange 62 and a spaced, parallel, rear flange 63 that are secured together by an inner end wall 64 and an outer end wall 65 and which terminate at their upper extremities in inclined flanges 66, 67, respectively. Each of the flanges 66, 67, rotatably supports a pair of bearing elements 68, 69, respectively, which are disposed in planes substantially at right angles to the other pair. The bearing elements are adapted to rotatably engage the top surface of the support rod 56, as shown in Fig. 3, for longitudinal movement thereon.

The lower ends 75, 76, of the inner and outer end walls 64, 65, respectively are inwardly offset towards each other so as to straddle a base or cartridge support arm 79 of channel-shaped cross section which is secured thereto by means of set screws 71, 72, respectively, that are threadingly engaged with the respective wall portions. While one of the set screws 72 is provided with a locking nut 73, a locking set screw 78 is disposed adjacent to the other aligned set screw 71 so as to enable the cartridge support arm 79 to be fixed in position relative to the carriage 61, for purposes hereinafter described. A cartridge 80 is secured to one extremity of the support arm 79 between downwardly extended flanges 82 thereof by means of an adjustable set screw 83 at one end of the support arm, which cartridge is provided with a record-engaging stylus 80a. The opposite extremity of the cartridge support arm 89 is provided with an upright flange 84 through which a stud 85 is threadingly engaged and which has a resilient sleeve 86 secured to the inwardly extended end thereof and an adjustable counter-weight 81 threadingly supported on the outside end thereof. The resilient sleeve 86, as shown in Fig. 5, is adapted to engage the lower edge 87 of the rear wall 52 of the housing 50, when the housing is tilted to disengage the stylus 80a from engagement with a record, which engagement acts as a brake to impede the movement of the carriage longitudinally of the support rod.

The forward, cartridge-supporting position of the carriage also supports a magnifying glass 88 having a hair line 89, in close association with a graduated scale 90 on the front wall 51 of the housing so that the position of the stylus relative to the record may be determined at any time or indexed for specific purposes. As more clearly shown in Figs. 3 and 5, the front flange 62 of the carriage threadingly supports a balance nut 93 so that the balance of the carriage may be adjusted depending upon the weight of the particular carriage secured thereto, for purposes hereinafter described. A pair of adjustable rubber grommets 95, 96, are provided along the length of the support rod 56 so as to control the inner and outer limits of movement of the carriage thereon. Adjacent to the outer extremity of the housing, a magnet 100 is secured to the inner surface of the front wall 51 for engaging a similar magnet 101 that is secured to the magnifying glass support member so that the stylus may be automatically disengaged from the record when the stylus has reached the end of the recording; by the attraction of the magnets, the carriage 61 is tilted upwardly, disengaging the stylus.

Figure 2:
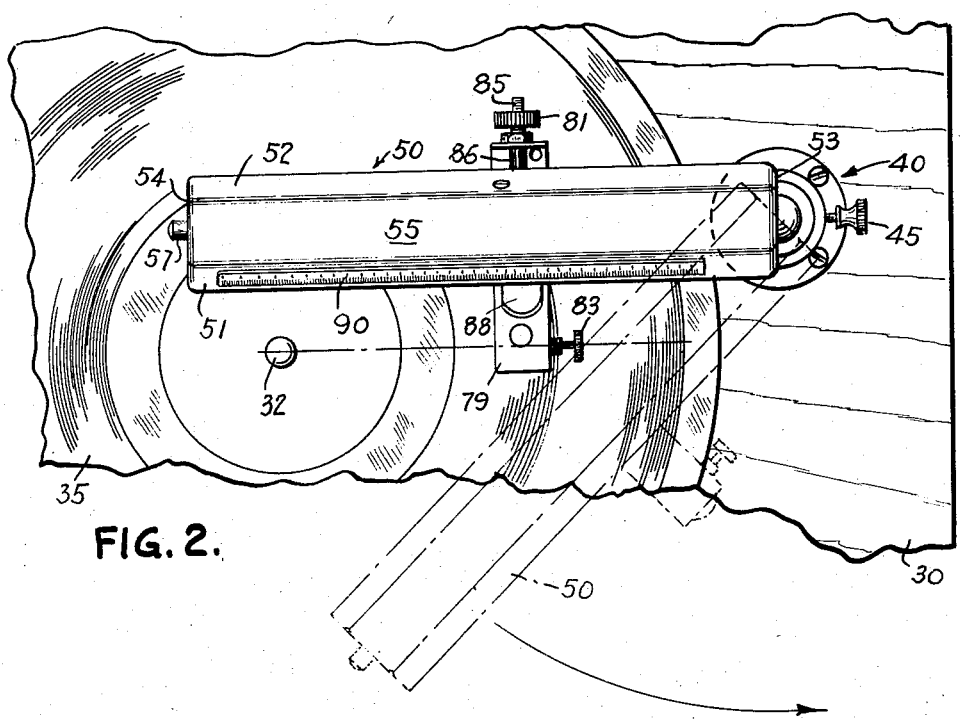
Fig. 2 is a top plan view of the apparatus shown in Fig. 1.

The tilting of the housing to control the engagement and disengagement of the stylus with the record, is interlocked with the release means for permitting rotation of the housing about its support post so that damage to the record may be prevented. Referring to Figs. 18 and 12a, the upper surface of a circular ring 115, that is secured to the sleeve 42, is provided with a vertical bore 105 that is enlarged at its upper portion 107, thereby providing a shoulder 109 therebetween. A locking pin 110 is slidably supported within the bore 105 and is partially enclosed by a compression spring 111 that acts between the shoulder 109 on which it is supported and the lower surface of the head 112 so as to urge the pin in an upward direction. The pin 110 is adapted to be engaged by the front wall 51 of the housing as it is pivoted about the support rod 56 downwardly to bring the stylus into engagement with the record, whereupon the pin is urged into engagement with the recess 114 in the sleeve 42 that is in alignment with the bore 105 when the housing is in an operative position relative to the record; that is, with the housing extending radially of the record, as shown in Fig. 2. Therefore, it will be observed that before the housing can be rotated about its support base out of this operative position, the housing must first be rotated about its support rod 56 to disengage the stylus from the record to thereby unlock the locking means or pin 110. The upper surface of the sleeve 42 is also provided with index means in the form of a positioning cam 122 which is adapted to be engaged by a follower or stop pin 120 secured to the lower surface of the circular ring 115 when the tone arm is swung into its operative position, whereby the pin prevents further rotation thereof as it engages the substantially vertical back wall 123 behind the sloped cam surface. While continued rotation of the tone arm is thus prevented, return of the tone arm to its inoperative position is readily permitted since the stop pin will ride upwardly against the action of the associated spring 49 along the sloped surface therefor.

Figure 1:
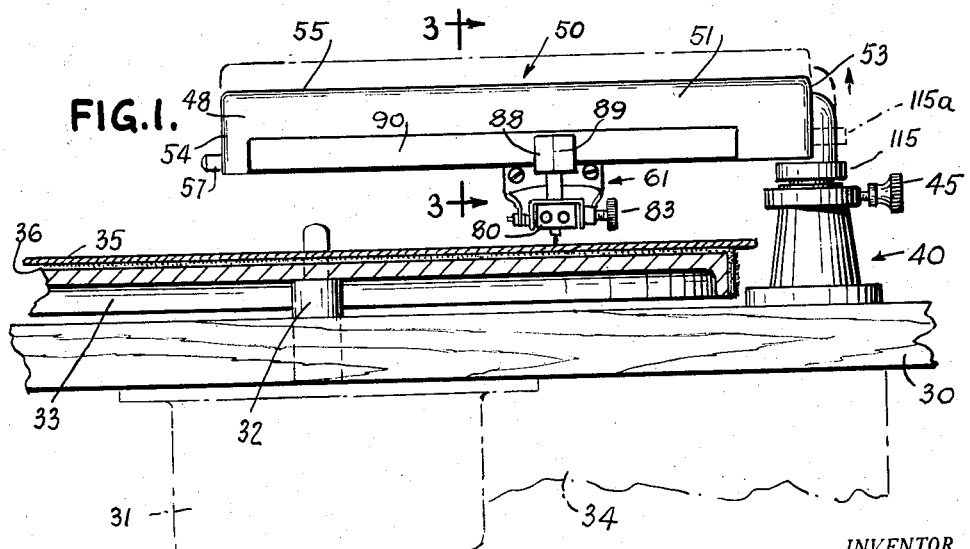
Fig. 1 is a side view, partly in section, showing a tone arm made in accordance with this invention in association with a record turntable.
Figure 19:
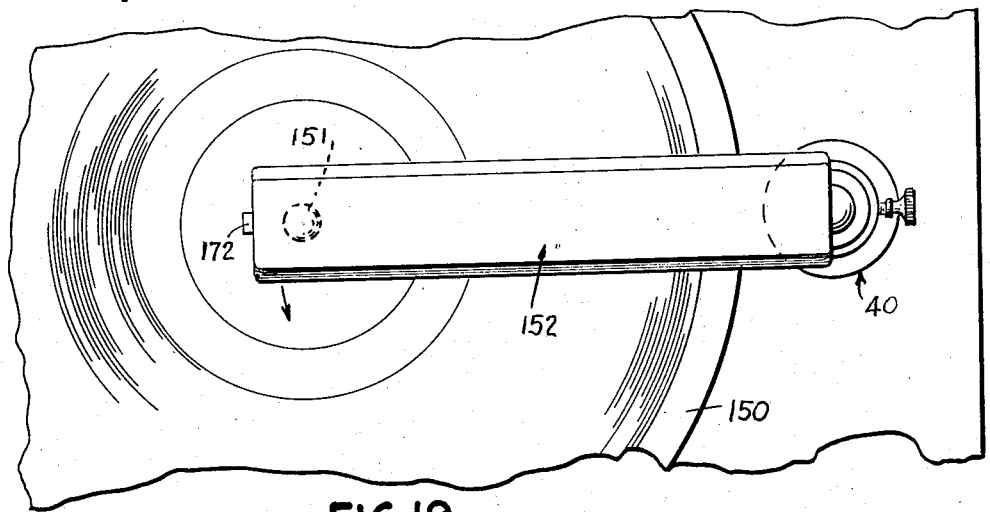
Fig. 19 is a view similar to Fig. 1, but showing a modified form of the invention.

In operation, the set screw 45 is used to secure the tone arm in proper position relative to the particular record being played, so that it is properly spaced vertically thereto and arranged parallel to a radius of the record so that the stylus 80a is caused to move along the radius of the record. With the tone arm properly adjusted in this manner, as shown in Figs. 1 and 2, the housing is tilted from the disengaged position, as shown in Fig. 5, to an engaged position, as shown in Fig. 3, whereupon the stylus 80a will engage the grooves of the record. The pressure of the stylus on the record may be adjusted by the counter-balance 81. Whenever it is desired to stop the play, the housing may be tilted back to the disengaged portion, whereupon, the resilient sleeve 86 will engage the lower edge of the housing 87 to hold the place thereof which may also be visually observed through the magnifier 88 and index 90.

When tilted to the disengaged position, the lock pin 110 will also have been disengaged from the recess 114, whereby the entire tone arm may be rotated about the axis of the support post to a convenient position whereby the record may be replaced or a new one added to the turn-table.

Additional vertical compliance of the cartridge carrier 79 may be had by the provision of the additional pivot formed about the axis of the set screws 71, 72, which may be resorted to by merely disengaging the additional set screws 78 associated with the carrier. Ordinarily, this additional feature is of no great importance, such that the carrier can be fixed against rotation merely by tightening down on the additional set screw 78. However, where great sensitivity is desired, it may be obtained by the provided structure. The balance adjustment mechanism 93 may be used to compensate for any variations caused by the use of this additional horizontal pivot, so that the carriage 61 may be maintained in a vertical plane.

Referring now to Figs. 19 through 25, a modification of the present invention is shown wherein a tone arm housing 152 is rotatably supported upon a base 153 in vertical alignment with a radius of the record 150 that is supported upon a turntable for rotation about a spindle 151. A carriage support rod 156 is longitudinally disposed within the housing 152 and is adapted to support a Y-shaped carriage 157 therefrom by means of two pairs of roller bearings 154, 155, that are rotatably carried by the carriage.

Referring to Fig. 20, a first upper portion of the carriage is shown to include a pair of vertical side walls 159, 160, and a pair of end walls 161, 162. The top of each side wall 159, 160, is terminated by an upwardly and outwardly extending flange 159a, 160a, respectively, each of which supports a pair of the roller bearings 154, 155, therefrom. A bottom wall 163 is integrally secured to each of the side walls and end walls so as to enclose the bottom end of the carriage assembly. As shown in Fig. 20, one form of track assembly 164 is shown to be secured to the lowermost half of the circular support rod 156 by such suitable means as screws 165. In this arrangement, the roller bearings are adapted to engage the top half of the support rod 156 for sliding movement therealong and are limited in their rotation about the longitudinal axis of the rod by the upper edges of the semi-circular track 164, thereby assuring the vertical disposition of the stylus support carriage 157.

Referring to Fig. 26, a modified form of support rod 156a is shown wherein the circular rod is provided with a pair of longitudinally extending metal strips 166 secured at diametrically opposed sides of the rod. In this arrangement, the roller bearings 154, 155, of the support carriage rollably engage the top surface of the rod 156a for movement longitudinally thereof, while the longitudinal strips 166 engage the lowermost edges of the roller bearings, thereby impeding rotation of the carriage about the longitudinal axis of the rod 156a, so as to assure the vertical disposition of the associated stylus.

A further modification of the support rod is shown in Fig. 27, wherein the rod 156b is of semi-circular cross section between its ends having the flat surface 168 thereof facing downwardly from the upper portion of the housing. A metal plate 169 is secured to the flat surface of the support rod by any suitable means such as by screws 170 so that the roller bearings 154, 155, which rollably engage the top, arcuate portions of the support rod are prevented from rotating about the longitudinal axis of the rod by their engagement with the metallic plate 169, thereby assuring the proper vertical disposition of the associated pick-up stylus.

In Fig. 28, a still further modified form of support rod 156c is shown to include a rod of square cross section having a diagonal disposed in the vertical plane of the support carriage. The roller bearings 154, 155 of the carriage rotatably engage the upper side surfaces of the support rod, which engagement provides a rollable surface along which the carriage may move longitudinally of the rod and also provides a stable support whereby rotation of the carriage about the longitudinal axis of the support rod 156c is impeded.

In each case, the longitudinal support rod is provided with a threaded end portion 171 for threadingly engaging the associated support post 153, and at its opposite end is provided with a rectangular fitting that is engaged with a similar shaped opening 173 in the outside end wall 174 of the tone-arm housing, whereby the housing is rigidly secured to the rod by means of the rectangular fitting 172 and is pivotally secured to the support post 153 by means of the engagement with the opposite end of the rod 156 which is threadingly secured to the head portion of the post. As more clearly shown in Fig. 20, the cartridge 175, having a stylus 176 vertically extended therebelow, is supported on the carriage 157 by means of a vertical stem 177 secured to the top surface of the cartridge and which has a transversely extending head portion 178 terminating in ears 179 that are slidably engaged within aligned slots 180 in the side walls 159, 160 of the carriage. The cartridge stem 177 is slidably disposed within a threaded sleeve 181 that extends through a hole 182 in the bottom wall 163 of the carriage. The downwardly extending lower portion of the sleeve is threaded so as to threadingly receive an adjustment nut 184. A compression spring 185 is carried by the upper portion of the stem 177 and is adapted to react between the head portion 178 of the stem and the top flange 183 of the threaded sleeve so as to provide a resilient support for the stylus 176. A similar compression spring 186 is carried by the lower portion of the stem 177 and is adapted to react between the upper surface of the cartridge and the lower surface of the adjustment nut 184 so as to provide a yielding vertical adjustment for the cartridge and stylus. It will be recognized, therefore, that the adjustment nut 184 provides means for adjusting pressure of the stylus 176 in the grooves 150a of the record, while the engagement of the upwardly disposed spring 185 provides a flexible counterbalancing effect.

In the operation of this tone arm 152, the support post 153 is adjusted in the same manner as that discussed in connection with the adjustment of the support post 40 used in the hereinbefore described embodiment. In this case, however, the support post adjusting screw 45 is used to secure the housing 152 in alignment with a radius of the turntable so that the longitudinal movement of the stylus 176 will follow this radius during its tracking movement from the outside to the inside extremity of the grooves 150a of the record. The stylus 176 is rotated into and out of engagement with the record, as shown in Fig. 22, merely by rotating the housing 152 about its support rod 156. Because of the engagement of the roller bearings 154, 155, of the support carriage with the particular support rod 156, 156a, 156b, or 156c, the cartridge 175 is virtually fixed to the housing 152 insofar as rotation about the support rod is concerned. While the adjustment screw 45 may be used to make rough height adjustments of the tone arm, the adjustment nut 184 carried by the cartridge carrier may be used to make fine pressure and record thickness adjustments.

It will be recognized that by means of this invention, a pick-up stylus is supported in engagement with the grooves of the record for movement along a radius of the record in the same manner as that employed during the cutting of the master record. This arrangement has been found to provide maximum record life and finest reproduction qualities since the stylus pressure can be minutely adjusted and since the movement of the stylus along the length of the associated tone arm is effected with a minimum amount of friction by means of the novel carrier and bearing arrangement.

While this invention has been described with particular reference to the specific forms shown in the drawing, it is to be understood that such showings are for illustrative purposes only and are not to be construed as imparting limitations upon the invention, which is best defined by the claims appended hereto.

I claim:

1. In turntable play-back sound-reproducing apparatus, a pick-up tone arm having a pick-up stylus that is adapted to be supported above a record carried by the turntable for movement parallel to a radius and plane of rotation thereof, said tone arm comprising longitudinally disposed carrier means, a carriage supported on said carrier means for substantially frictionless movement longitudinally thereof, said stylus being carried by said carriage and constructed and arranged to be selectively moved between an operative and an inoperative position, a support for rotatably supporting said carrier for rotation about a vertical axis, said support comprising a fixed base, a sleeve carried by said base and arranged for rotatable and vertical movement relative thereto, a post disposed within said sleeve and arranged for rotatable and vertical movement relative thereto, and pivot means connecting said carrier to said post for pivotal movement about a substantially horizontal axis, securing means associated with said base for releasably securing said sleeve in a selective, vertical and rotational position, first index means operatively associated with said post and sleeve for limiting rotational movement of said post relative to said sleeve in one direction and permitting rotational movement thereof in an opposite direction, and second index means operatively associated with said post and said sleeve and said carrier and constructed and arranged to selectively lock said post against rotation relative to said sleeve in both directions when the stylus is moved to said operative position and releasing said post for such rotation when said stylus is moved to said inoperative position.

2. Apparatus as set forth in claim 1, wherein said first index means comprises a cam slot opening in one rotational direction and a follower adapted to releasably engage said cam slot, said cam slot being carried by one of said sleeve and said post members and said follower being carried by the other of the said sleeve and said post members.

3. Apparatus as set forth in claim 2, wherein spring means are disposed between said sleeve and said post for resiliently urging said post into engagement with said sleeve and resisting disengagement of said follower and said cam.

4. Apparatus as set forth in claim 1, wherein said second index means comprises a recess and a locking pin adapted to lockingly engage said recess, said recess being disposed in said sleeve and said locking pin being carried by said post, resilient means normally urging said pin out of engagement with said recess, said carrier comprising engaging means adjacent to said pin, to depress said pin in said recess against the action of said spring when said stylus is moved to said operative position and to release said pin for retraction from said recess when said stylus is moved to said inoperative position.

References Cited in the file of this patent
UNITED STATES PATENTS

| | | |
|---|---|---|
| 1,291,515 | Hinckley | Jan. 14, 1919 |
| 2,413,206 | Worsham | Dec. 24, 1946 |
| 2,532,293 | Weese | Dec. 5, 1950 |
| 2,566,091 | Masterson | Aug. 28, 1951 |
| 2,694,615 | Clements | Nov. 16, 1954 |
| 2,721,109 | Ross | Oct. 18, 1955 |
| 2,776,144 | Nichols | Jan. 1, 1957 |